(12) United States Patent
Van Hensbergen et al.

(10) Patent No.: US 7,315,896 B2
(45) Date of Patent: Jan. 1, 2008

(54) SERVER NETWORK CONTROLLER INCLUDING PACKET FORWARDING AND METHOD THEREFOR

(75) Inventors: Eric Van Hensbergen, Austin, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 10/165,068

(22) Filed: Jun. 6, 2002

(65) Prior Publication Data

US 2003/0229702 A1 Dec. 11, 2003

(51) Int. Cl.
G06F 15/16 (2006.01)
G06F 15/173 (2006.01)

(52) U.S. Cl. ............... 709/228; 709/227; 709/239

(58) Field of Classification Search ........... 709/203, 709/246, 238; 370/254, 389; 713/201
See application file for complete search history.

(56) References Cited

U.S. PATENT DOCUMENTS

| | | | |
|---|---|---|---|
| 5,477,547 A | 12/1995 | Sugiyama | |
| 5,802,366 A | 9/1998 | Row et al. | |
| 6,084,858 A | 7/2000 | Matthews et al. | |
| 6,101,543 A | 8/2000 | Alden et al. | |
| 6,230,200 B1 | 5/2001 | Forecast et al. | |
| 6,243,379 B1 * | 6/2001 | Veerina et al. | 370/389 |
| 6,262,976 B1 * | 7/2001 | McNamara | 370/254 |
| 6,321,336 B1 * | 11/2001 | Applegate et al. | 713/201 |
| 6,628,654 B1 * | 9/2003 | Albert et al. | 370/389 |
| 6,751,728 B1 | 6/2004 | Gunter et al. | |
| 6,779,035 B1 * | 8/2004 | Gbadegesin | 709/228 |
| 6,880,089 B1 * | 4/2005 | Bommareddy et al. | 713/201 |
| 6,968,394 B1 | 11/2005 | El-Rafie | |
| 6,970,913 B1 | 11/2005 | Albert et al. | |
| 2001/0037358 A1 | 11/2001 | Clubb et al. | |
| 2002/0065938 A1 | 5/2002 | Jungck et al. | |

OTHER PUBLICATIONS

U.S. Appl. No. 09/998,048.
AUS920020081US1, Server Network Controller Including Server-Directed Packet Forwarding and Method Therefor.

* cited by examiner

*Primary Examiner*—Kenny Lin
(74) *Attorney, Agent, or Firm*—Mitch Harris, Atty at Law, LLC; Andrew M. Harris; Casimer K. Salys

(57) ABSTRACT

A network controller including a packet forwarding mechanism and method therefor improve load-balancing within a network system without requiring an intelligent switch having TCP splicing capability. If the network controller node is becoming overloaded (for example as indicated by a full output FIFO), the network controller forwards connections directly to alternate servers. The network controller and method further provide improved fail-safe operation, as the network controller can more easily detect failure of the coupled server than can a remote switch being monitored for failure of a connected server node. The packet forwarding mechanism can be implemented very compactly within the firmware of the network controller, providing a load-balancing solution with little incremental cost (as opposed to an intelligent switch solution) and with tight coupling to the server, providing a redirection solution from the point that has the most information available regarding the status of the associated server node.

20 Claims, 5 Drawing Sheets

SERVER NETWORK CONTROLLER INCLUDING PACKET FORWARDING AND METHOD THEREFOR

CROSS-REFERENCE TO RELATED APPLICATIONS

The present application is related to previously-filed U.S. patent application: "SYSTEM AND METHOD FOR KNOWLEDGABLE NODE INITIATED TCP SPLICING" Ser. No. 09/998,048 filed on Nov. 29, 2001 by the same inventors and having the same assignee. The present application is also related to U.S. patent application "SERVER NETWORK CONTROLLER INCLUDING SERVER-DIRECTED PACKET FORWARDING AND METHOD THEREFOR" Ser. No. 10/165,066 filed concurrently herewith by the same inventors and having the same assignee. The specifications of both of the above-referenced patent applications are incorporated herein by reference.

BACKGROUND OF THE INVENTION

1. Technical Field

The present invention relates generally to networked computer systems, and more specifically, to a server network controller, associated firmware and server software.

2. Description of the Related Art

Networked computer systems, including local area networks (LANs) and wide area networks (WANs) such as the Internet, have increased bandwidth demand due to the rapidly increasing number of network installations and network users. The demand for increased bandwidth, especially on the Internet and connected sub-networks such as intranets, has been met by installing increasing numbers of network servers, increasing the number of network nodes. There is a need for scalability in the above-described network systems and applications, so that the network systems can be expanded as the need for increased bandwidth continues.

Typically, network switches handle load distribution in multiple server connections. Intelligent switches may route connection requests to particular servers (back-end nodes) based on a parsing of the request to determine the type or location of requested content (layer-7 or application layer switching) or standard switches may simply "spray" connection requests among servers in order to evenly distribute the network load. While a switch may filter connections based on content type, protocol type or connection age, switches do not maintain detailed information about network status and therefore other techniques must be employed to provide a rapid and robust response to changes in network status.

The above-incorporated patent application provides an alternative to routing connection requests at the switch by providing a mechanism that determines appropriate connection forwarding at a back-end node. A connection is forwarded by the switch in response to receiving a message from the back-end node handling the original connection request. While this mechanism provides intelligent forwarding of connections in that the back-end nodes generally have more information regarding network loading status and the availability and latency of requested content, the solution described requires an intelligent switch. Further, the solution described in the above-incorporated patent application has a slow response to changes in network status and content availability, as the switch routing tables must be updated in response to control messages transmitted from the back-end nodes to the switch.

Therefore, it would be desirable to provide an improved network connection routing method and system that does not require an intelligent switch and that has a fast response to changes in server load and content availability.

SUMMARY OF THE INVENTION

The above objective of providing an improved network connection routing method and system is achieved in an intelligent network controller. The network controller may be an intelligent peripheral installed within a server or may be a network processor (NP) coupled to a server. The method and system forward connections by determining whether or not a particular connection should be handled by another node and in response to determining that the particular connection should be handled by another node, the network controller forwards the connection by performing header mangling within the network controller. The packet destination addresses are modified to reflect the address of the other node and the source address is modified to reflect a node of the network controller. Responses received from the other node are modified to indicate a response from the original destination node, thus making the connection forwarding transparent to external switches and other devices.

The method and system may be implemented by program instructions in firmware within a network controller, forming a computer program product in accordance with an embodiment of the present invention.

The foregoing and other objectives, features, and advantages of the invention will be apparent from the following, more particular, description of the preferred embodiment of the invention, as illustrated in the accompanying drawings.

DETAILED DESCRIPTION OF PREFERRED EMBODIMENT

Figure 1:
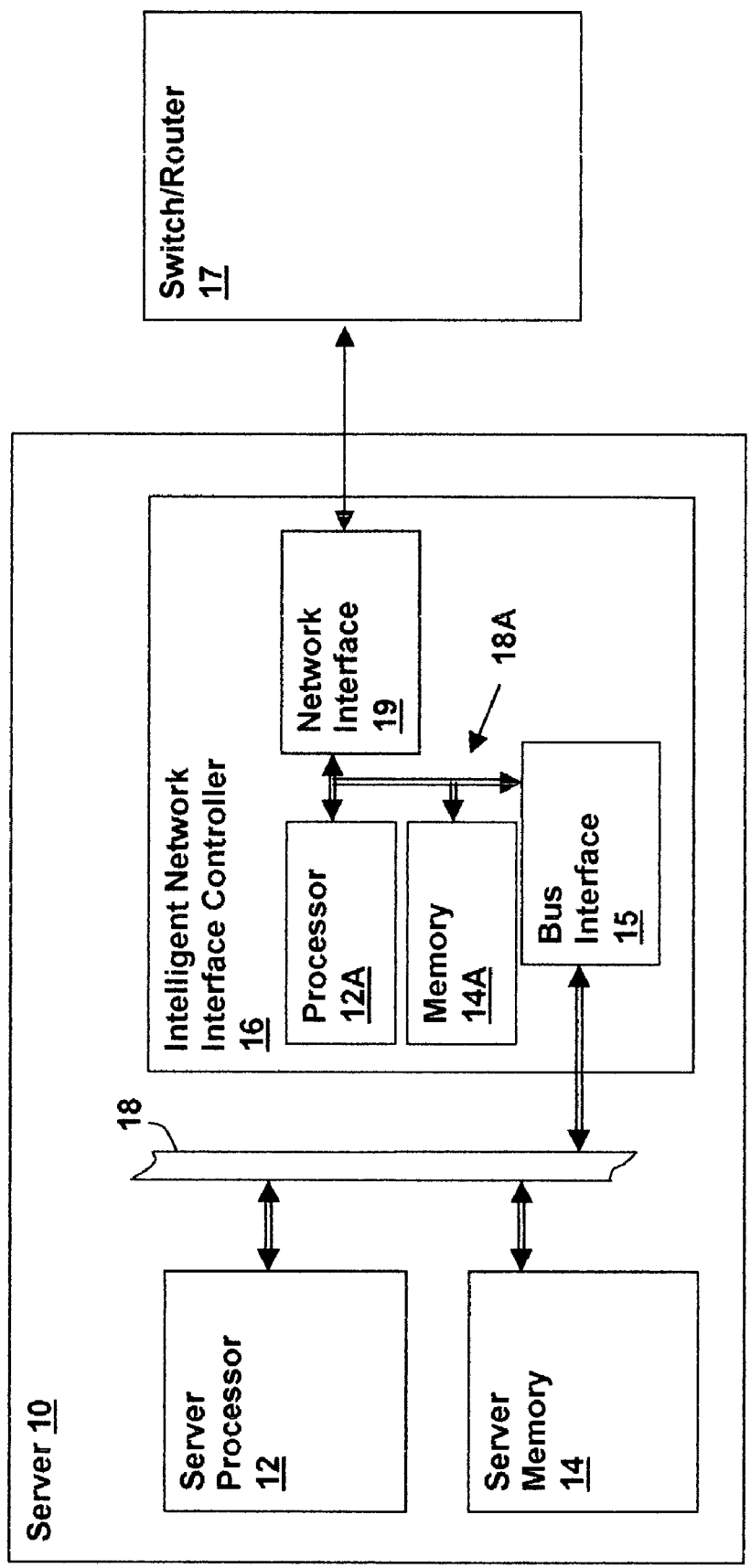
FIG. 1 is a block diagram depicting a server connected to a network and including a network controller interface in accordance with an embodiment of the invention.

Referring to the figures, and in particular to FIG. 1, a network server 10 including an intelligent network interface controller 16 in accordance with an embodiment of the invention is depicted. Server 10 incorporates a server processor 12 for executing server program instructions and a server memory 14 coupled to server processor 12 via a Peripheral Component Interconnect (PCI) or other local bus 18 for storing server program instructions and data. Network controller 16 is also coupled to bus 18, providing a pathway for communications between server processor 12, server memory 14 and network controller 16.

Network controller 16 includes a controller processor 12A for executing controller program instructions and is coupled via a local bus 18A to a controller memory 14A for storing controller program instructions and data, including data buffers for network packet storage. A bus interface 15 couples controller processor 12A and controller memory 14A to bus 18, providing a mechanism for communication between applications executed by server processor 12 and program instructions executed by processor 12A from memory 14A, which may be firmware instructions stored in non-volatile memory, downloadable software instructions stored in random access memory (RAM) or other suitable mechanism for providing instructions to controller processor 12A for implementing methods in accordance with embodiments of the present invention.

A network interface 19 is coupled to local bus 18A for communicating network packets (generally transmission control protocol/Internet protocol (TCP/IP) packets) between external network devices and server 10. A switch/router 17 is shown connected to network interface 19, but multiple devices and other types of connections (e.g., bridges, other servers) may be provided depending on the network connections required for particular applications. The present invention provides a mechanism for "TCP splicing" that may reside entirely within server 10, and in fact may be restricted to network controller 16, so switch/router 17 may be a simple switch, in contrast to the switch of the above-incorporated patent application that provides TCP splicing using a mechanism distributed across a switch and the server.

Filtering of connections may be based on one or more of several criteria: age of connection (including new connection detection), type of connection (e.g., hypertext transfer protocol (HTTP), file transfer protocol (FTP), or e-mail) and protocol (e.g., layer 3 or layer 4 connections). For example, a first server may be optimized for short term connections, so all new connections may be routed to the first server, while a second server may be used for long-term connections and all connections for which a sequence number exceeds a predetermined number are then spliced to the second server. Another example is where an e-mail server and a web server are coupled to a common front-end switch. An intelligent network controller in each server can splice connections, avoiding reception and retransmission by each server of requests and data for the other server, without requiring Layer-7 type routing at the switch.

Figure 2:
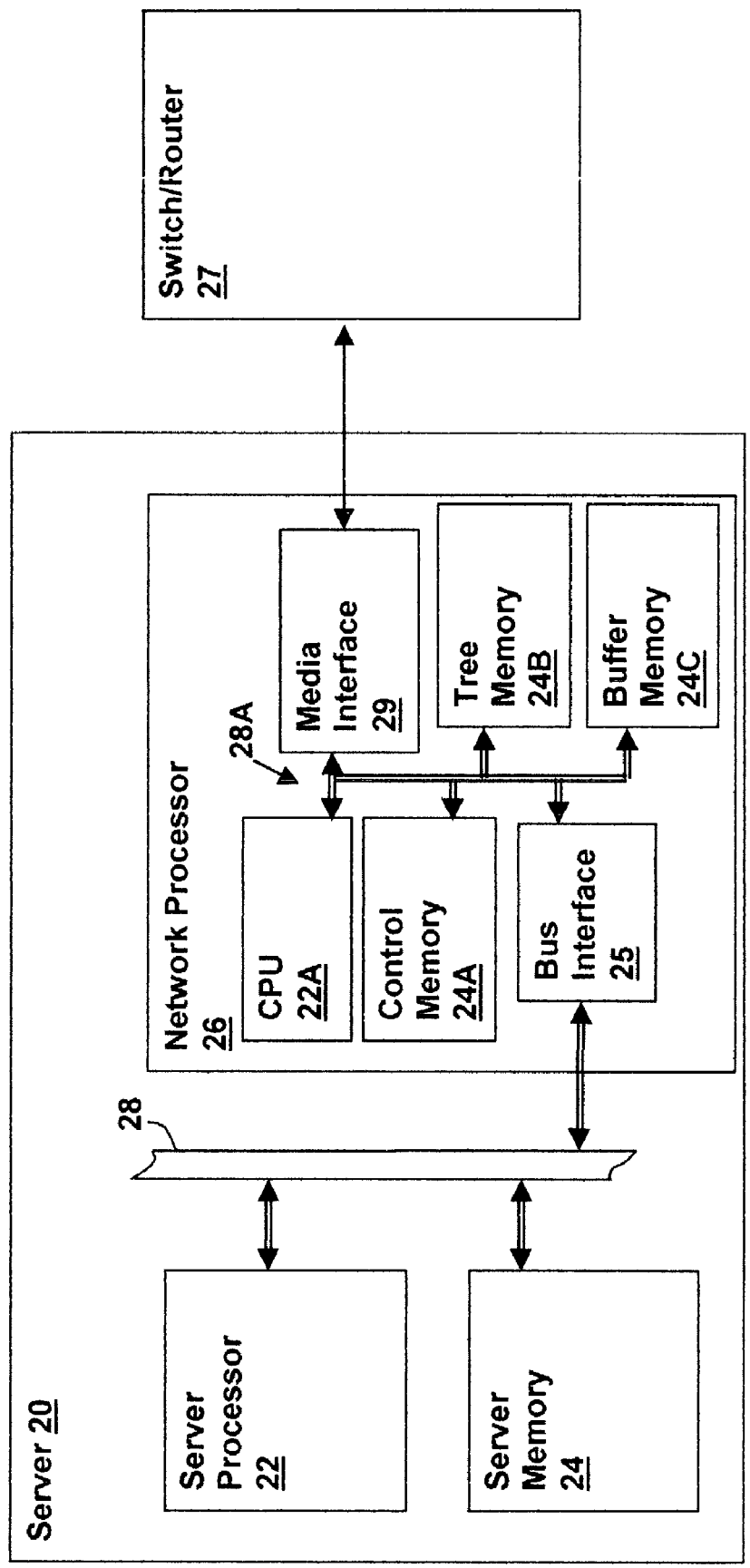
FIG. 2 is a block diagram depicting a server connected to a network and including a network processor in accordance with an embodiment of the invention.

Referring now to FIG. 2, a server 20 including a network processor 26 in accordance with an embodiment of the invention is depicted. Server 20 incorporates a server processor 22 for executing server program instructions and a server memory 24 coupled to server processor 22 via a Peripheral Component Interconnect (PCI) of other local bus 28 for storing server program instructions and data. Network processor 26 is also coupled to bus 28, providing a pathway for communications between server processor 22, server memory 24 and network processor 26.

Network processor 26 includes a central processing unit 22A for executing program instructions and is coupled via a local bus 28A to a control memory 24A for storing program instructions and data. Network processor 26 is also coupled to tree memory 24B for storing filter trees and packet processing trees that may be dynamic or static protocol trees. Network processor 26 is also coupled to buffer memory 24C for providing packet storage. Trees within network processors provide packet routing and manipulation. The trees are compiled and downloaded to tree memory 24B and provide instructions to dedicated hardware engines within network processor 26 that process packets.

A bus interface 25 couples CPU 22A, control memory 24A, tree memory 24B and buffer memory 24C to bus 18, providing a mechanism for communication between applications executed by server processor 22 and program instructions executed by CPU 22A from control memory 24A, which may be firmware instructions stored in non-volatile memory, downloadable software instructions stored in random access memory (RAM) or other suitable mechanism for providing instructions to CPU 22A for implementing methods in accordance with embodiments of the present invention. Methods in accordance with embodiments of the present invention may also be implemented within protocol trees stored within tree memory 24B, whereby header mangling and packet routing are performed in accordance with a downloaded protocol processing tree.

A media interface 29 is coupled to local bus 28A for communicating network packets (generally transmission control protocol/Internet protocol (TCP/IP) packets over Ethernet) between external network devices and server 20. A switch/router 27 is shown connected to media interface 29, but multiple devices and other types of connections (e.g., bridges, other servers) may be provided depending on the network connections required for particular applications. The present invention provides a mechanism for "TCP splicing" that may reside entirely within server 20, and in fact may be restricted to network processor 26, so switch/router 27 may be a simple switch, in contrast to the switch of the above-incorporated patent application that provides TCP splicing using a mechanism distributed across a switch and the server.

Figures 3A, 3B:
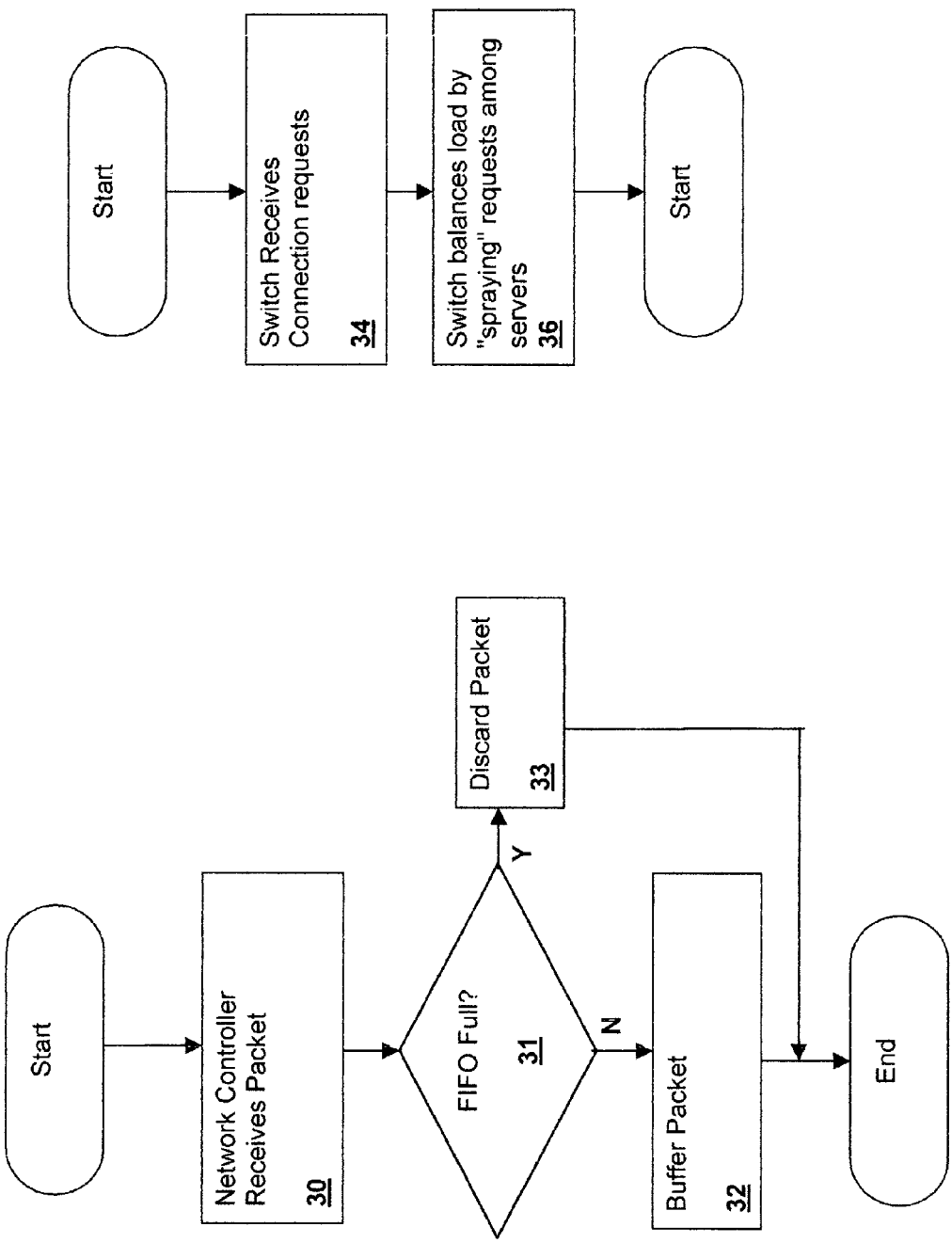
FIGS. 3A and 3B are flowcharts depicting operation of a prior art connection forwarding scheme.

Referring now to FIGS. 3A and 3B, a prior art packet processing mechanism is depicted. When a network controller receives a packet (step 30), if the FIFO buffer for the particular input node is full (decision 31), the packet is typically discarded (step 33), if the buffer is not full, the packet is buffered for further processing (step 32). Connection requests are typically managed by a switch or router. When a switch receives connection requests (step 34), the switch balances the network load by "spraying" requests among servers connected to the switch (step 36). Spraying is typically performed in a round-robin fashion, providing equal distribution of connections among servers, but without taking into account server loading. The above-incorporated patent application provides an alternative mechanism for allocating connections from a switch, but the switch is still managing the allocation of connections, requiring an intelligent switch and communication of connection routing commands from back-end nodes, such as a connected server.

Figure 4:
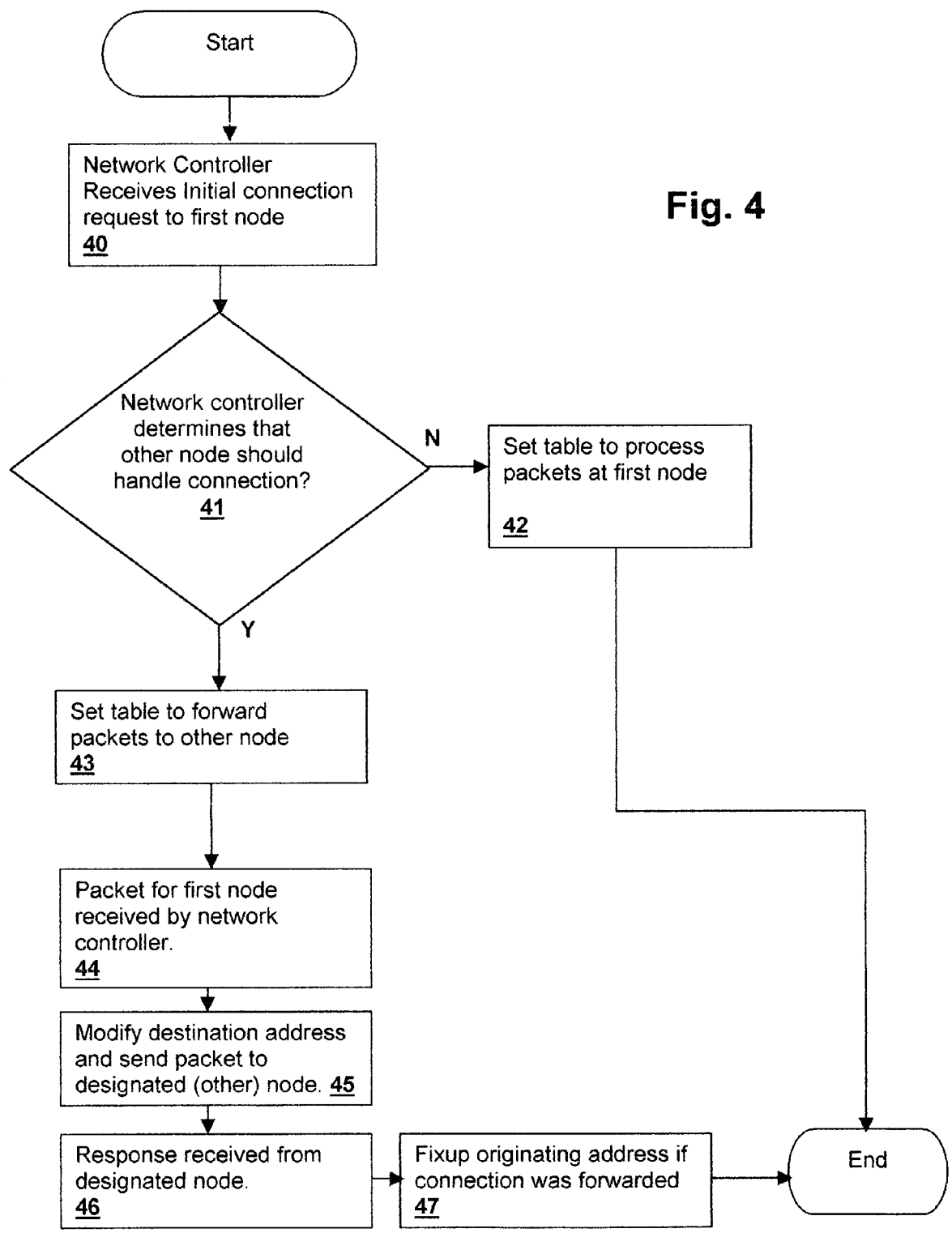
FIG. 4 is a flowchart depicting operation of a connection forwarding scheme in accordance with an embodiment of the present invention.

Referring now to FIG. 4, a method in accordance with an embodiment of the invention as may be performed by network controller 16 of FIG. 1 or network processor 26 of FIG. 2 is depicted. When network controller 16 (or network processor 26) receives an initial connection request to a first node (step 40), if network controller 16 (or network processor 26) determines that another node should handle the connection (decision 41), a packet forwarding table (or network processing tree) is updated to forward packets to the alternative node (step 43). Otherwise, the connection request is sent to the first node (step 42). When a packet for the first node is received (step 44), the header is mangled (step 45) by network controller 16 (or network processor 26) to contain a destination address of the other node identified in step 41. When a response is received from the other node, network controller 16 (or network processor 26) modifies the origin address of the packet to reflect a response from the first node (step 47) providing transparent splicing of the requested connection. While the flowchart illustrates splicing of an original connection, a connection may be spliced at any time, depending on network conditions (e.g. buffer capacity for a given node) detected at network controller 16 (or network processor 26) or based on information communicated to network controller 16 (or network processor 26) from server 10 (or server 20). As network controller 16 (or network processor 26) are generally specifically adapted for packet processing, the techniques of the present invention yield very efficient results without an external intelligent switch. Communication of network status or data availability from server 10 (or server 20) to affect connection splicing can be made very rapidly, since network controller 16 and network processor 26 are coupled directly to their corresponding servers.

Figure 5A:
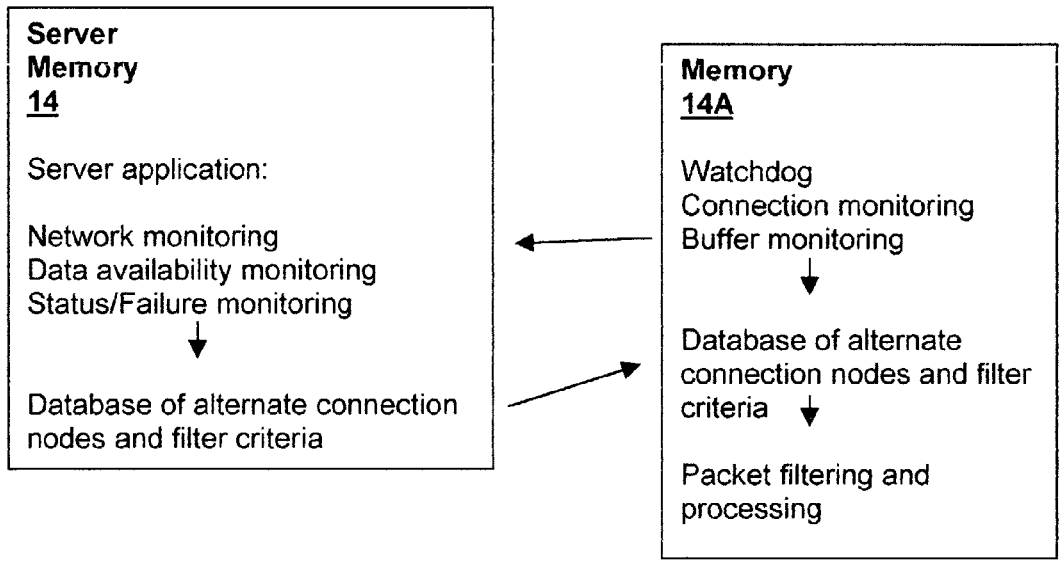
FIGS. 5A and 5B are pictorial diagrams showing the organization and intercommunication of software and/or firmware modules in accordance with embodiments of the present invention.

Referring now to FIG. 5A the organization and intercommunication of software and/or firmware modules in accordance with an embodiment of the present invention as may be implemented within server 10 is depicted. A server application resident within server memory 14 provides network monitoring based on information that may be received from other servers, status within the server itself or communicated from network controller 16 via a device driver resident in server memory 14. Status and failure monitoring may also be used to intelligently avoid nodes or servers that have failed or are producing error conditions. Data availability monitoring within server 10 and availability information communicated to server 10 from other servers may be used to determine a more appropriate connection based on information that a particular server may provide faster access to the data (e.g., a server already has particular HTML data loaded within its cache). The result of the network monitoring, status/failure monitoring and/or data availability monitoring can be used to build a database of alternate connection nodes and mappings for transmission via a device driver to network controller 16. Alternatively or in concert, program instructions within controller memory 14A may build a database of alternate connection nodes or be provided with such a database from server 10 via a device driver during initialization. The database may be modified in response to internal connection monitoring and buffer monitoring program instructions resident within controller memory 14A. A watchdog function may be implemented by program instructions within controller memory 14A to monitor network connections and server 10 to determine whether or not to forward connections to other servers or nodes.

Controller memory 14A also contains firmware or downloadable software instructions for packet processing and performs required header manipulation for splicing connections in response to determining more appropriate nodes for particular connections. As described above, the splicing may be performed at connection establishment, or may be performed "on-the-fly" during transmission and reception of data for a particular connection.

Figure 5B:
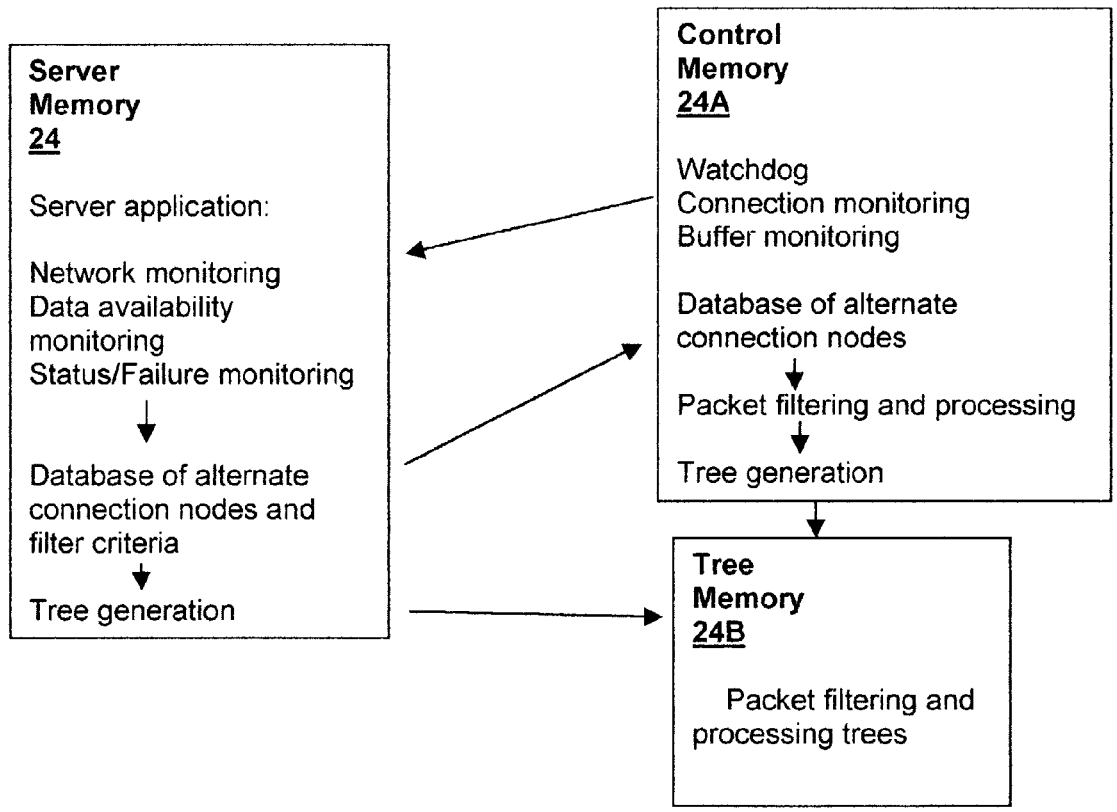

Referring now to FIG. 5B, the organization and intercommunication of software and/or firmware modules in accordance with an embodiment of the present invention as may be implemented within server 20 is depicted. As described above for server 10, a server application resident within server memory 24 provides network monitoring based on information that may be received from other servers, status within the server itself or communicated from network processor 26 via a device driver resident in server memory 24. Status and failure monitoring may also be used to intelligently avoid nodes or servers that have failed or are producing error conditions. Data availability monitoring within server 20 and availability information communicated to server 20 from other servers may be used to determine a more appropriate connection based on information that a particular server may provide faster access to the data (e.g., a server already has particular HTML data loaded within its cache). The result of the network monitoring, status/failure monitoring and/or data availability monitoring can be used to build a database of alternate connection nodes and mappings for transmission via a device driver to network processor 26. Alternatively or in concert, program instructions within control memory 24A may build a database of alternate connection nodes or be provided with such a database from server 20 via a device driver during initialization. The database may be modified in response to internal connection monitoring and buffer monitoring program instructions resident within control memory 24A. The server application may also build packet processing trees for download to tree memory 24B, or program instructions within control memory 24A may build or modify trees within tree memory 24B for performing the TCP splicing operations. A watchdog function may be implemented by program instructions within control memory 24A to monitor network connections and server 20 to determine whether or not to forward connections to other servers or nodes.

Control memory 24A may also contain firmware or downloadable software instructions for packet processing and perform required header manipulation for splicing connections in response to determining more appropriate nodes for particular connections. Alternatively or in concert, tree memory 24B may contain required information for performing the required header manipulation. As described above, the splicing may be performed at connection establishment, or may be performed "on-the-fly" during transmission and reception of data for a particular connection.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for forwarding connections at a server, comprising:
    receiving a packet at a network controller of said server, wherein said packet is destined for an original destination node of said server and was provided by an originating source;
    within said network controller, selecting an alternate destination node for said packet;
    modifying a destination address and an origin address of said packet within said network controller to produce a modified packet containing a destination address of said alternate destination node and an origin address of a response node of said network controller;
    transmitting said modified packet from said network controller to said alternate destination node; and
    building a database within said server of alternate destinations for packet data, and wherein said selecting selects said alternate destination node form said database.

2. The method of claim 1, wherein said receiving receives a packet from a switch coupled to said network controller and wherein said transmitting transmits said modified packet to said switch.

3. The method of claim 1, wherein said database of alternate destinations is transmitted within said server to a memory of said network controller, whereby said network controller may select said alternate destination node from said database.

4. The method of claim 1, further comprising: analyzing network traffic at said server; and building said database in conformity with a result of said analyzing.

5. The method of claim 1, further comprising
detecting that a size of a packet buffer for said original destination node has exceeded a predetermined threshold, and wherein said selecting, modifying and transmitting are performed in response to said detecting.

6. The method of claim 1, wherein said packet is a connection request, wherein said selecting selects an alternate node for said connection, and wherein said modifying and transmitting are performed for subsequent packets received for said connection.

7. The method of claim 1, further comprising:
receiving a response packet from said alternate destination node at said response node;
modifying an origination address and a destination address of said response packet within said network controller to produce a modified response packet containing an origination address of said original destination node and a destination address of said originating source; and
transmitting said modified response packet from said network controller to said originating source.

8. A server system, comprising:
a processing unit, including a server memory for storing server program instructions for execution by a server processor within said processing unit; wherein said server program instructions include:
program instructions for building within said server a database of alternate destinations for packet data; and
program instructions for transferring said database to said network controller, whereby said network controller may select said alternate destination node from said database;
a bus for interconnecting said processing unit with peripheral devices; and
a network controller coupled to said bus for coupling said server system to a network, said network controller including a controller processor and a controller memory coupled to said controller processor for storing controller program instructions for execution by said controller processor, and wherein said controller program instructions include instructions for
receiving a packet at a network controller of said server, wherein said packet is destined for an original destination node of said server and was provided by an originating source;
selecting an alternate destination node for said packet;
modifying a destination address and an origin address of said packet within said network controller to produce a modified packet containing a destination address of said alternate destination node and an origin address of a response node of said network controller; and
transmitting said modified packet from said network controller to said alternate destination node.

9. The server system of claim 8, wherein said network controller includes a network processor and wherein said controller processor and said controller memory are included within said network processor.

10. The server system of claim 8, wherein said server program instructions further comprise program instructions for: analyzing network traffic at said server; and building said database in conformity with a result of said analyzing.

11. The server system of claim 8, wherein said controller program instructions further comprise program instructions for detecting that a size of a packet buffer for said original destination node has exceeded a predetermined threshold, and wherein said program instructions for selecting, modifying and transmitting are executed in response to said detecting.

12. The server system of claim 8, wherein said packet is a connection request, wherein said controller program instructions for selecting select an alternate node for said connection, and wherein said program instructions for modifying and transmitting are executed for subsequent packets received for said connection.

13. The server system of claim 8, wherein said controller program instructions further comprise program instructions for:
receiving a response packet from said alternate destination node at said response node;
modifying an origination address and a destination address of said packet within said network controller to produce a modified response packet containing an origination address of said original destination node and a destination address of said originating source; and
transmitting said modified response packet from said network controller to said originating source.

14. A server system, comprising:
a processing unit, including a server memory for storing server program instructions for execution by a server processor within said processing unit;
a bus for interconnecting said processing unit with peripheral devices; and
a network controller coupled to said bus for coupling said server system to a network, said network controller including a controller processor and a controller memory coupled to said controller processor for storing controller program instructions for execution by said controller processor, and wherein said controller program instructions include instructions for
receiving a packet at a network controller of said server, wherein said packet is destined for an original destination node of said server and was provided by an originating source;
selecting an alternate destination node for said packet;
modifying a destination address and an origin address of said packet within said network controller to produce a modified packet containing a destination address of said alternate destination node and an origin address of a response node of said network controller;
transmitting said modified packet from said network controller to said alternate destination node; and
building within said intelligent network controller a database of alternate destinations for packet data, and wherein said program instructions for selecting select said alternate destination node from said database.

15. A computer program product comprising computer-readable storage medium encoding program instructions for execution within a controller processor of a network controller, said program instructions comprising program instructions for:

receiving a packet at a network controller of said server, wherein said packet is destined for an original destination node of said server and was provided by an originating source;

selecting an alternate destination node for said packet; modifying a destination address and an origin address of said packet within said network controller to produce a modified packet containing a destination address of said alternate destination node and an origin address of a response node of said network controller;

transmitting said modified packet from said network controller to said alternate destination node;

building within said network controller a database of alternate destinations for packet data, and wherein said program instructions for selecting select said alternate destination node form said database.

16. The computer program product of claim 15, wherein said program instructions further comprise program instructions for detecting that a size of a packet buffer for said original destination node has exceeded a predetermined threshold, and wherein said program instructions for selecting, modifying and transmitting are executed in response to said detecting.

17. The computer program product of claim 15, wherein said packet is a connection request, wherein said program instructions for selecting select an alternate node for said connection, and wherein said program instructions for modifying and transmitting are executed for subsequent packets received for said connection.

18. The computer program product of claim 15, wherein said program instructions further comprise program instructions for:

receiving a response packet from said alternate destination node at said response node;

modifying an origination address and a destination address of said packet within said network controller to produce a modified response packet containing an origination address of said original destination node and a destination address of said originating source; and transmitting said modified response packet from said network controller to said originating source.

19. A computer program product comprising computer-readable storage medium encoding program instructions for execution within a server processor of a server including a network controller, said server program instructions include:

program instructions for building within said server a database of alternate destinations for packet data; and program instructions for transferring said database to said network controller, whereby said network controller may select said alternate destination node from said database.

20. The computer program product of claim 19, wherein said server program instructions further comprise program instructions for:

analyzing network traffic at said server; and building said database in conformity with a result of said analyzing.

* * * * *